United States Patent
Paniconi et al.

(10) Patent No.: US 8,249,160 B2
(45) Date of Patent: Aug. 21, 2012

(54) EXTRACTING MULTIPLE CLASSIFIED ADAPTIVE DECIMATION FILTERS

(75) Inventors: Marco Paniconi, San Jose, CA (US); Oguz Demirci, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 992 days.

(21) Appl. No.: 12/245,672

(22) Filed: Oct. 3, 2008

(65) Prior Publication Data
US 2010/0088355 A1    Apr. 8, 2010

(51) Int. Cl.
*H04N 7/46* (2006.01)
(52) U.S. Cl. ............................. 375/240.21; 375/240.12
(58) Field of Classification Search .............. 375/240.12, 375/240.21
See application file for complete search history.

(56) References Cited

U.S. PATENT DOCUMENTS

| 6,600,495 | B1 * | 7/2003 | Boland et al. ................. 345/660 |
| 6,826,584 | B1 | 11/2004 | Carrig et al. |

FOREIGN PATENT DOCUMENTS

| EP | 0 677 821 A2 | 10/1995 |
| EP | 0 851 690 A1 | 7/1998 |
| EP | 851690 A1 | 7/1998 |

OTHER PUBLICATIONS

Elad, M., et al., "Variable Projection for Near-Optimal Filtering in Low Bit-Rate Block Coders", IEEE Transactions on Circuits and Systems for Video Technology, IEEE Service Center, Piscataway, NJ, US, vol. 15, No. 1, Jan. 2005, p. 154-160, XP011124678, ISSN: 1051-8215.

European Search Report, EP 09 25 2323, Feb. 8, 2010, 3 pgs.
Hang, J-K, et al., "Joint Optimization of the Motion Estimation Module and the Up/Down Scaler in Transcoders", IEEE Transactions on Circuits and Systems for Video Technology, IEEE Service Center, Piscataway, NJ, US, vol. 15, No. 10, Oct. 1, 2005, pp. 1303-1313, XP011139788 ISSN: 1051-8215.
Elad M, et al., "Variable Projection for Near-Optimal Filtering in Low Bit-Rate Block Coders", IEEE Transactions on Circuits and Systems for Video Technology , IEEE Service Center, Piscataway, NJ, US, vol. 15, No. 1, Jan. 1, 2005, pp. 154-160, XP011124678, ISSN: 1051-8215.
Bezdek, et al., "Some Notes on Alternating Optimization", Lecture Notes in Computer Science, Springer Verlang, DE, vol. 2275, Feb. 3, 2002, pp. 288-300, XP002331420, ISSN: 0302-9743.
Dempster, A.P., et al., "Maximum Likelihood From Incomplete Data Via The EM Algorithm" Journal of the Royal Statistical Society, Series B. Methodological, Royal Statistical Society, London, GB, vol. 39, No. 1, Jan. 1, 1977, pp. 1-38, XP009002229, ISSN: 0035-9246.

\* cited by examiner

*Primary Examiner* — Sath V Perungavoor
*Assistant Examiner* — Jeffery Williams
(74) *Attorney, Agent, or Firm* — Blakely, Sokoloff, Taylor & Zafman LLP

(57) ABSTRACT

A plurality of initial decimation filters are concatenated into an initial combined decimation filter. The initial decimation filters are assigned to a plurality of classes which associate the initial decimation filters with regions of an image to be predicted. An input signal is generated from the initial combined decimation filter and is weighted with a plurality of prediction filters. A correlation matrix and an observation vector are generated for the initial combined decimation filter from the input signal. An optimized combined decimation filter is extracted from the correlation matrix and observation vector. The optimized filter comprises a plurality of optimized decimation filters. The optimized combined decimation filter is de-concatenated into the plurality of optimized decimation filters.

9 Claims, 17 Drawing Sheets

EXTRACTING MULTIPLE CLASSIFIED ADAPTIVE DECIMATION FILTERS

RELATED APPLICATIONS

The present application is related to the following commonly-owned, concurrently-filed application: application Ser. No. 12/245,659, filed Oct. 3, 2008, entitled "Adaptive Decimation Filter."

FIELD OF THE INVENTION

This invention relates generally to data processing, and more particularly to video encoding.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright© 2008, Sony Electronics Inc., All Rights Reserved.

BACKGROUND OF THE INVENTION

An important and fundamental problem in various video processing applications, such as compression and zooming, is decimation and prediction. Decimation involves generating a smaller version of a source data. A common example is video compression, which uses a decimation filter to decimate an original frame in order to create a decimated frame. To decompress the video frame, a prediction filter generates a target frame from the decimated frame. The quality of the target frame may be expressed by measuring the difference between the original frame and the target frame, which is the prediction error. One existing process used to improve the quality of the target frame is to use an adaptive prediction filter. An adaptive prediction filter is modified with respect to a corresponding decimated frame to improve the quality of the target frame, while the decimation filter remains fixed. A classified prediction filter is a adaptive prediction filter that applies different filters/classes to different pixels/regions in an image.

FIG. 2A illustrates a fixed decimation filter with a decimation factor of ¼ that reduces the original frame to a decimated frame one quarter the size of the original. Original pixels 205 (unfilled) are each assigned a decimation filter coefficient of ¼. In other words, to generate the decimated pixel 210, original pixels 205 will be averaged. FIG. 2B illustrates a fixed decimation filter with a decimation factor of ⅑. Original pixels 250 (unfilled, plus an original pixel in the same location as target pixel 255) each contribute ⅑ to the value of decimated pixel 255. After applying the decimation filter illustrated in FIG. 2A or 2B, the source data has been reduced in size consistent with the decimation factor.

SUMMARY OF THE INVENTION

A plurality of initial decimation filters are concatenated into an initial combined decimation filter. The initial decimation filters are assigned to a plurality of classes which associate the initial decimation filters with regions of an image to be predicted. An input signal is generated from the initial combined decimation filter and is weighted with a plurality of prediction filters. A correlation matrix and an observation vector are generated for the initial combined decimation filter from the input signal. An optimized combined decimation filter is extracted from the correlation matrix and observation vector. The optimized filter comprises a plurality of optimized decimation filters. The optimized combined decimation filter is de-concatenated into the plurality of optimized decimation filters.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
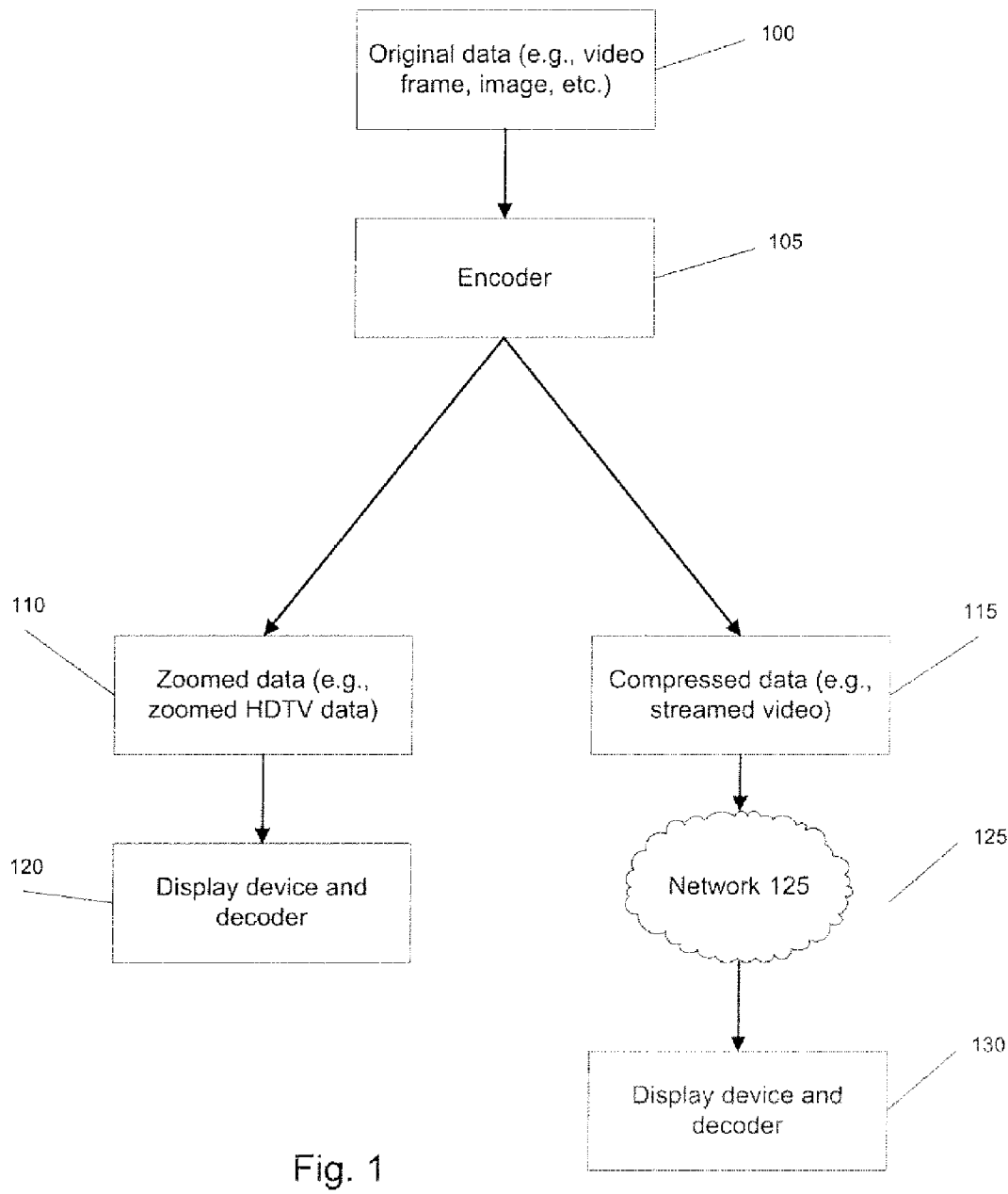
FIG. 1 is a diagram illustrating a overview of the operation of an embodiment of an adaptive decimation filter according to the invention.
Figure 2A:
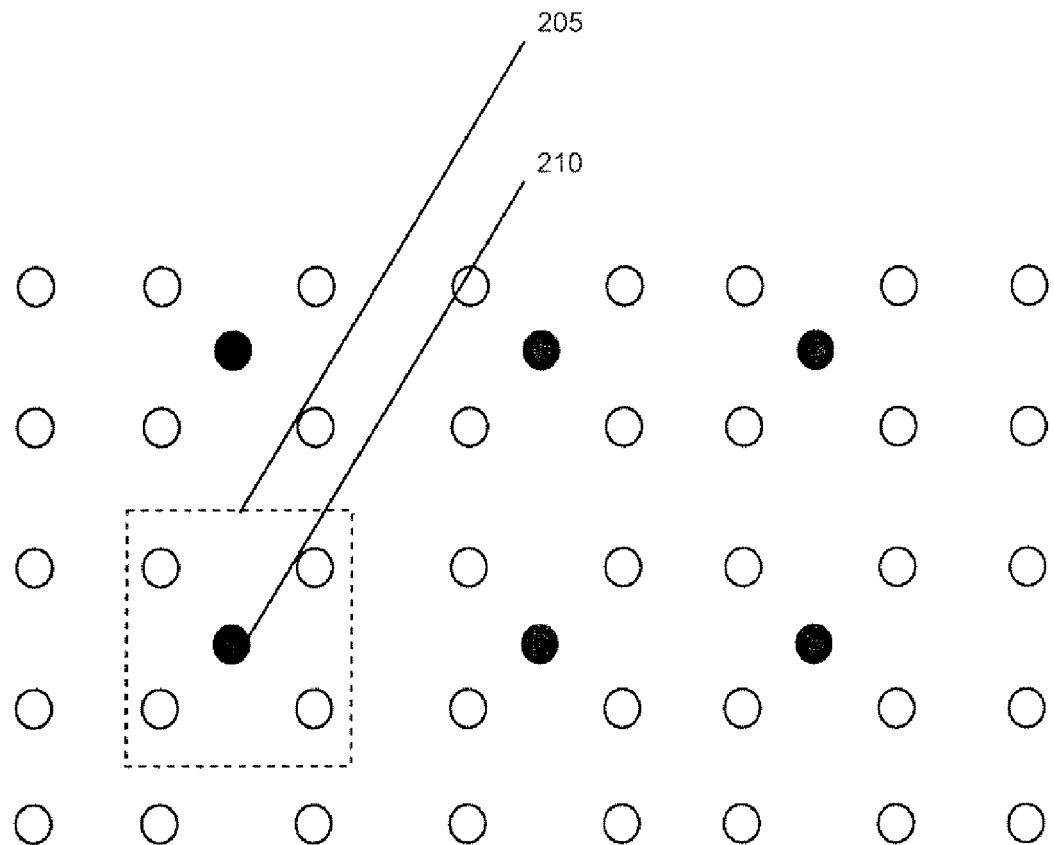
FIGS. 2A and 2B are diagrams illustrating fixed decimation filters as known in the art.
Figure 2B:
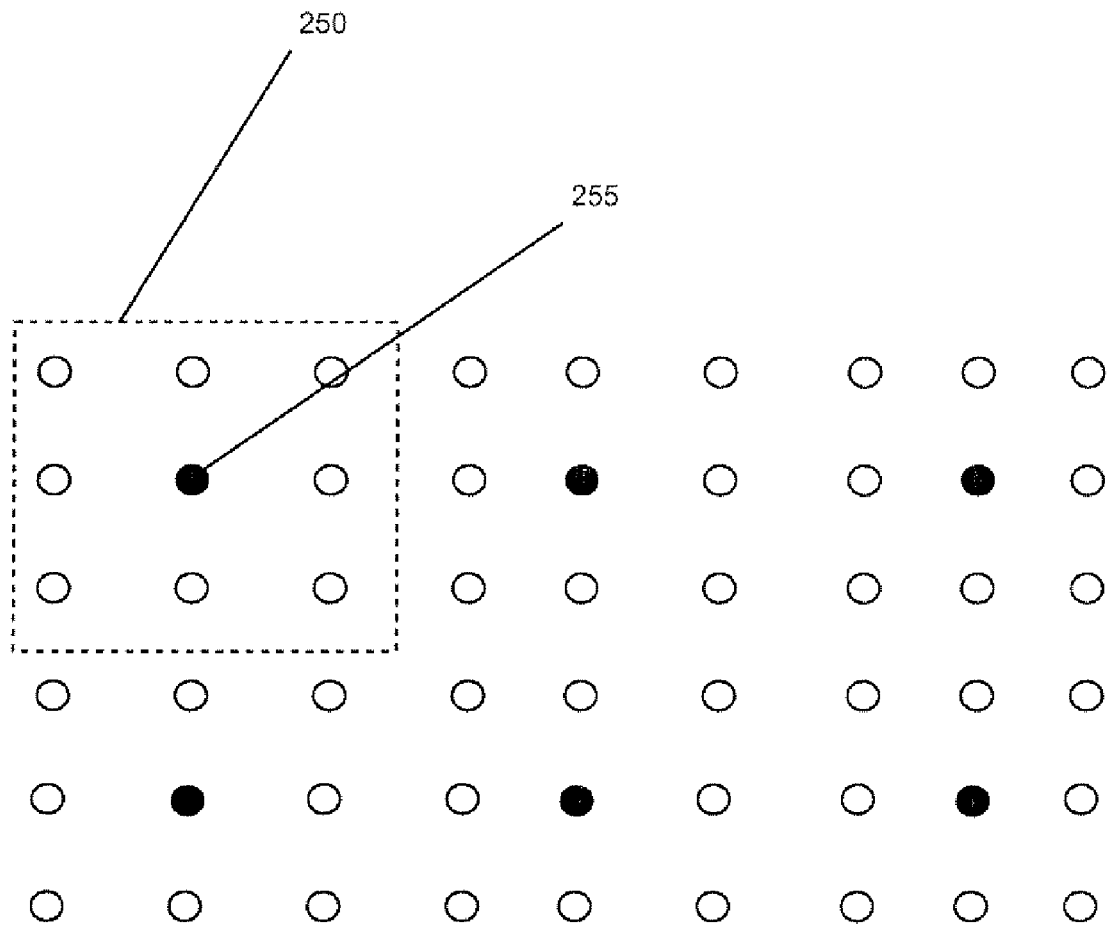

Beginning with an overview of the operation of the invention, FIG. 1 illustrates one embodiment of adaptive decimation filtering. Original data 100 is encoded at encoder 105 using adaptive prediction and decimation filters. The original data 100 may be video data from a BluRay player, which a user wishes to view on a standard definition television such as device 120. To accomplish this, encoder 105 may zoom data 100 to produce zoomed data 110, which device 120 is able to decode and display at the appropriate aspect ratio. The encoded data from encoder 105 may take the form of compressed data 115, which encoder 105 may cause to be sent over network 125 to device 130 to decode and display. For example, data 100 may be live video of a sporting event.

The predictive strength of a prediction filter or a decimation filter may understood in terms of how similar an original frame is to a reconstruction of that original frame using the prediction filter. Optimizing either a prediction filter or a decimation filter is the process of adjusting the coefficients that make tip the filter in a way that decreases the difference between the source frame and the target frame. In other words, reducing the prediction error associated with the target frame.

Optimizations to a decimation filter are present, indirectly, in the target frame by way of the decimated frame that the prediction filter uses to generate the target frame. As an example, suppose a prediction filter L is used to generate two target frames, P and P'. To generate the target frames, L is applied to two decimated frames, D and D', which were generated by two decimation filters, H and H'. Further suppose that the first target frame, P, has an average prediction error of 0.05 when compared to original image I, while the second target frame P' has an average prediction error of 0.10 when compared to I. Since the same prediction filter L, is used to produce both target frames, the difference in accuracy is attributable to the decimated frames and thus the different decimation filters.

Figure 4:
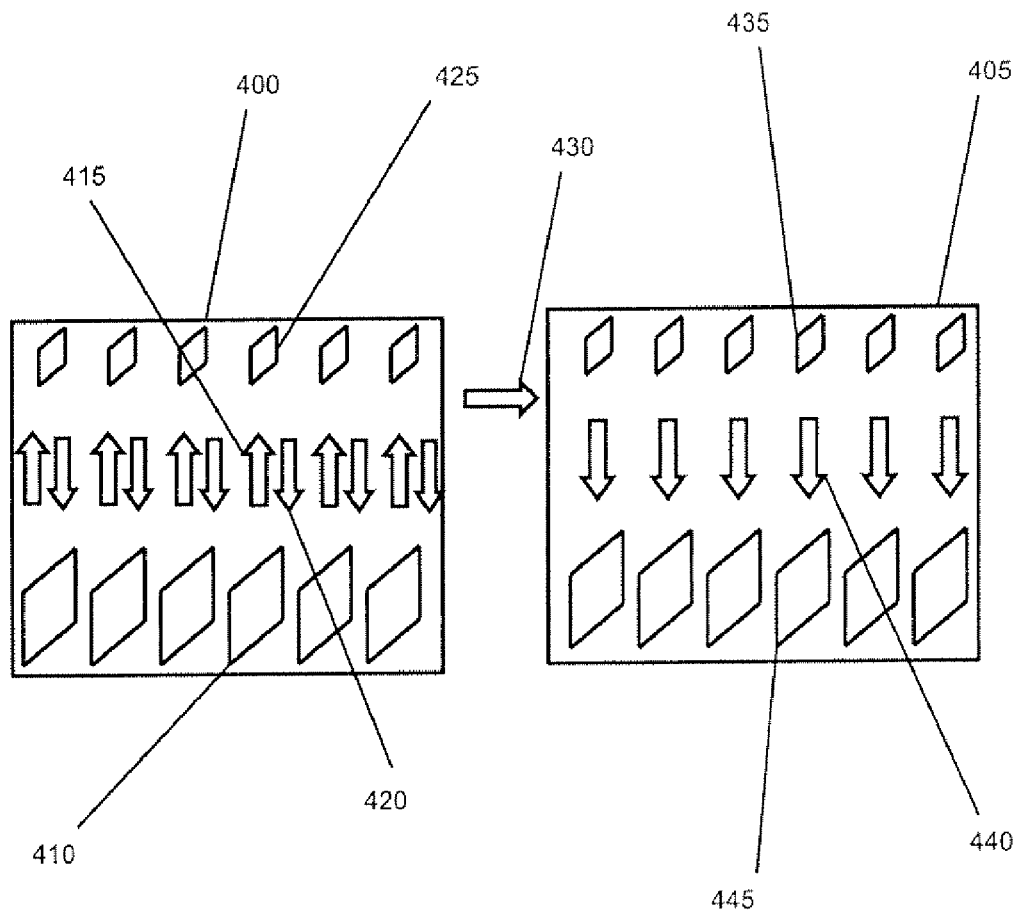
FIG. 4 is a data flow diagram illustrating the operation of an adaptive decimation filter according to an embodiment of the invention.

FIG. 4 is a data flow diagram illustrating the operation of an adaptive decimation filter according to an embodiment of the invention. Encoder context 400 includes original frames 410 and decimated frames 425, which are decimated 415 by an encoder such as encoder 105 and predicted 420 to improve a prediction by measuring the error of the prediction. Encoded data 430 is sent to decoder 405. For example, over network 125. Decoder 105 uses decimated frames 435 and filter coefficients also included in the encoded data 430 to predict 440 predicted frames 445. Predicted frames 445 may be displayed to a user.

Figure 5:
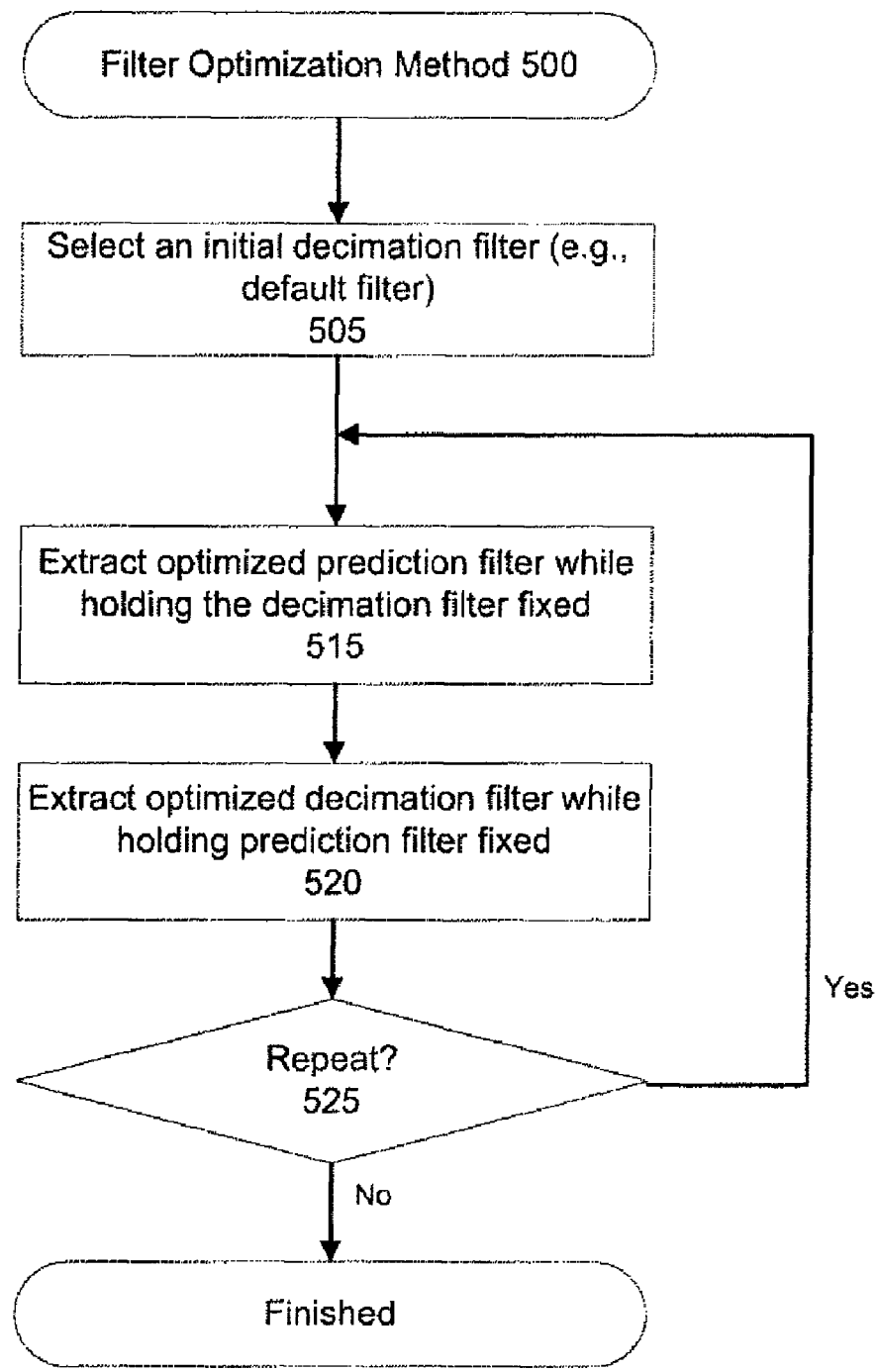
FIG. 5 is a flow diagram of a filter optimization method to be performed by a computer according to an embodiment of the invention.

Next, the particular methods of the invention are described in terms of computer software with reference to a series of flow diagrams. FIGS. 5 and 7 are flow diagrams illustrating methods according to embodiments of an adaptive decimation filter. Encoder 105 may perform the methods illustrated in FIGS. 5 and 7. The methods constitute computer programs made up of machine-executable instructions illustrated as blocks (acts) 505 until 525 in FIG. 5 and blocks 705 to 740 in FIG. 7. Describing the methods by reference to a flow diagram enables one skilled in the art to develop such programs including such instructions to carry out the methods on suitably configured machines (the processor of the machine executing the instructions from machine-readable storage media, including memory such as RAM) [computerized clients (the processor of the clients executing the instructions from machine-readable media). Similarly, the methods to be performed by the server constitute computer programs also made up of machine-executable instructions. Describing the methods by reference to flow diagrams enables one skilled in the art to develop programs including instructions to carry out the methods on a suitable computerized server (the processor of the server executing the instructions from machine-readable storage media).] The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 5 and 7 without departing from the scope of the invention and that no particular order is implied by the arrangement of blocks shown and described herein.

Figure 3:
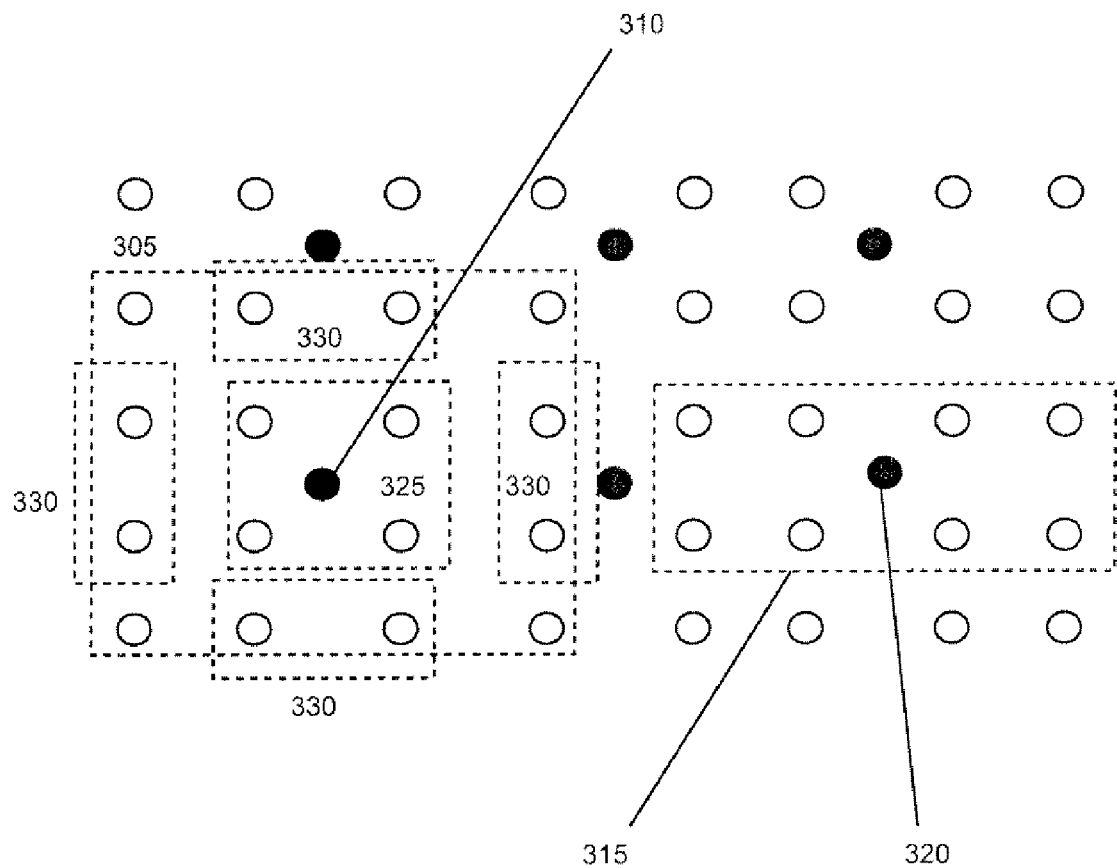
FIG. 3 is a diagram illustrating an adaptive decimation filter according to an embodiment of the invention.

FIG. 3 is a diagram illustrating adaptive decimation filtering according to an embodiment of the invention. Pixel tap 305 includes pixel regions 325 and 330 and corresponds, through the decimation filter, to decimated pixel 310. To improve the predictive strength of the decimation filter, encoder 105 may optimize the decimation filter by changing the number of pixels included in a pixel tap or the coefficients corresponding to pixels in a pixel tap used to generate a decimated pixel. For example, in a fixed decimation filter with a decimation factor of ¼, the decimation filter may use a pixel tap such as pixel region 325. Encoder 105 may expand this initial tap to create pixel tap 305, which incorporates additional pixels into the tap. Pixels in region 325 may have coefficients of 0.125, while pixels in region 330 may have coefficients of 0.05, and pixels in corners of the tap may have coefficients of 0.025. By increasing the size of pixel tap 305, more original data is available to generate decimated pixel 310, which in turn may improve the quality of a target frame. The encoder may also vary the filter coefficients according to which original pixels produce a better prediction.

For example, encoder 105 may also modify a pixel tap to exploit underlying features of the original frame. Pixel tap 315, for example, is elongated in the horizontal direction, and corresponds to decimated pixel 320. The region of the original frame from which pixel tap 315 is drawn may contain a horizontal feature (e.g., a brick in a wall), in which case a horizontally elongated pixel tap such as pixel tap 315 may produce a decimated pixel 320 which provides greater predictive strength to a prediction filter.

FIG. 5 illustrates a filter optimization method according to an embodiment of the invention. Encoder 105 may perform filter optimization method 500 to optimize an adaptive decimation filter and an adaptive prediction filter. One obstacle to optimizing both the decimation filter and the prediction filter is that a simultaneous optimization would be a non-linear process. The prediction filter depends on the decimated frame, which is obtained with the decimation filter. An optimized decimation filter provides high prediction strength, where prediction strength depends directly on the prediction filter. The non-linearity of the relationship may be expressed as a function of the prediction and decimation filters:

$$I^D = H \cdot I \quad (1)$$

where $I^D$ is the decimated frame. H is the decimation filter, and I is the original frame. The prediction filter may be defined as:

$$P = L(H) \cdot I^D \quad (2)$$

where P is a target frame and prediction filter L is a function of H. Thus, target frame P may be expressed as:

$$P = L(H) \cdot H \cdot I \quad (3)$$

and prediction error E may be expressed as:

$$E = (I-P)^2 = (I - L(H) \cdot H \cdot I)^2 \quad (4)$$

which is a nonlinear function in L and H. To obtain optimal prediction and decimation filters, prediction error E is minimized. Since the error function is nonlinear, no direct method to extract optimal solutions for both the prediction and decimation filters is available.

In the embodiment illustrated by FIG. 5, a recursive process is used to optimizing the prediction and decimation filters. This process uses a linear error function. At block 505, the method 500 selects an initial decimation filter. For example, initial decimation filter may be a fixed decimation filter. At block 515, the method 500 extracts an optimized prediction filter while holding the decimation filter fixed. By keeping the decimation filter fixed, the error function becomes quadratic. Thus, minimizing the prediction error yields linear equations for a solution of the filter, which allows the method to extract an optimized prediction filter for the current decimation filters Extracting an optimized prediction filter is described in greater detail below in conjunction with FIG. 7.

At block 520, the method 500 extracts an optimized decimation filter while holding the prediction filter extracted in block 515 fixed. By holding the prediction filter fixed, the error function becomes quadratic, allowing the method to extract an optimized decimation filter for the current prediction filter. If at decision 525 the method determines the optimization is complete, the method returns control to, for example, encoder 105. Otherwise, the method returns to block 515 to further optimize the filters.

By using the recursive process described above, the method 500 incrementally improves both the decimation filter and the prediction filter. Since prediction strength depends upon the adaptability of both filters, changes to one filter may make new improvements possible in the other filter.

Figure 6:
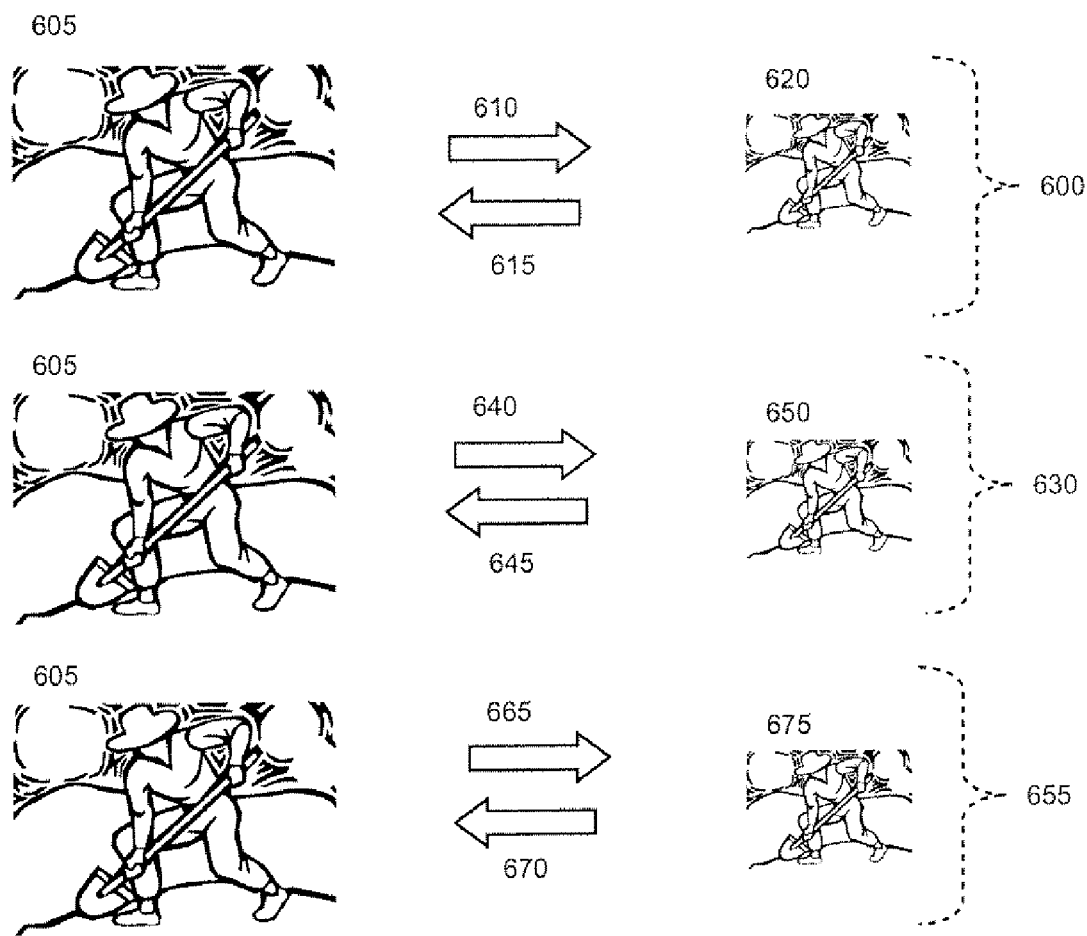
FIG. 6 is a diagram illustrating the operation of an adaptive decimation filter according to an embodiment of the invention.

FIG. 6 illustrates the operation of the filter optimization method illustrated in FIG. 5. Passes 600, 630, and 655 represent sequential optimizations of prediction and decimation filters. The method 500 decimates original frame 605 with an initial decimation filter 610 to produce decimated frame 620. The method 500 extracts an optimized prediction filter 615 from decimated frame 620, as described in greater detail below in conjunction with FIG. 7. During pass 630, the method 500 extracts an optimized decimation filter 640 from original frame 605 while holding prediction filter 615 fixed. The method 500 generates a decimated frame 650 with decimation filter 640 and extracts an optimized prediction filter 645 while holding decimation filter 640 fixed. During pass 655, the method 500 extracts an optimized decimation filter 665 while holding prediction filter 645 fixed. The method 500 generates decimated frame 675 using decimation filter 665. The method 500 extracts an optimized prediction filter 670 using decimated frame 675. The method 500 determines that the results of optimization have saturated and relinquishes control, for example, to encoder 105.

FIG. 7 illustrates a method to be performed according to an embodiment of the invention. At block 705, the method 700 selects an initial decimation filter, such as a fixed decimation filter with the desired decimation factor. At block 710, the method 700 generates a decimated frame by applying the decimation filter to an original frame (e.g., a frame of video). At block 715, the method 700 generates classes for a prediction filter using the decimated frame using one of many processes known in the art. At block 720, the method 700 extracts a classified prediction filter while holding the decimation filter fixed. The method generates an optimized prediction filter by keeping the decimation filter as a fixed variable.

The notation used to describe the filter extraction process is described, followed by the process itself. The original frame signal level is denoted for an individual pixel $\vec{x}$ as $I(\vec{x})$. The decimated frame signal level is denoted for the decimated pixel $\vec{y}$ as $I^D(\vec{y})$, while the set of decimated pixels defined on the prediction filter tap for the prediction of target pixel $\vec{x}$, where the j index runs over the filter tap of the prediction filter is $\vec{y}_j^{\vec{x}}$.

The prediction of the original frame for the pixel $\vec{x}$ is $P(\vec{x})$ and is defined in the following paragraph. The prediction filter corresponding to the prediction filter class u is denoted as $L^u$.

The prediction filter is derived from the minimization of the prediction error, holding the decimation filter constant. The prediction for the pixel $\vec{x}$ may be defined as:

$$P(\vec{x}) = \sum_j L_j^u I^D(\vec{y}_j^{\vec{x}}) \quad (5)$$

while the prediction filter class for the pixel $\vec{x}$ may be defined as:

$$u = S(\vec{x}) \quad (6)$$

while the prediction error may be defined as:

$$e = \sum_{\vec{x}} (I(\vec{x}) - P(\vec{x}))^2 \quad (7)$$

A least squares training solution involves computing a correlation matrix and observation vector over all pixels $\vec{x}$ such that $S(\vec{x}) = u$. The least squares solution yields a stable solution when the set of pixels is large enough for each filter class. The method 700 extracts the prediction filter $L^v$ for some class v from prediction error minimization with fixed decimation using a least squares solution:

$$\left. \frac{\delta e}{\delta L_k^v} \right|_H = 0 \quad (8)$$

$$\sum_{\vec{x}} (I(\vec{x}) - P(\vec{x})) \sum_j \frac{\delta L_j^u}{\delta L_k^v} I^D(\vec{y}_j^{\vec{x}}) \quad (9)$$

$$\sum_{\{\vec{x}|v=S(\vec{x})\}} (I(\vec{x}) - P(\vec{x}))I^D\left(\vec{y}_k^{\vec{x}}\right) = 0 \quad (10)$$

$$\sum_{\{\vec{x}|v=S(\vec{x})\}} I(\vec{x})I^D\left(\vec{y}_k^{\vec{x}}\right) = \sum_{\{\vec{x}|v=S(\vec{x})\}} \sum_j L_j^v I^D\left(\vec{y}_j^{\vec{x}}\right) I^D\left(\vec{y}_k^{\vec{x}}\right) \quad (11)$$

$$b_k^v = \sum_j L_j^v A_{j,k}^v \quad (12)$$

The optimized prediction filter for class v may be given by:

$$L^v = (A^v)^{-1} b^v \quad (13)$$

where $$A_{j,k}^v = \sum_{\{\vec{x}|v=S(\vec{x})\}} I^D\left(\vec{y}_j^{\vec{x}}\right) I^D\left(\vec{y}_k^{\vec{x}}\right) \quad (14)$$

is the correlation matrix for class v and $$b_k^v = \sum_{\{\vec{x}|v=S(\vec{x})\}} I(\vec{x}) I^D\left(\vec{y}_k^{\vec{x}}\right) \quad (15)$$

is the observation vector for class v, resulting in v independent matrix equations, one for each class in the filter. The indexes {j, k} run over the prediction filter taps $$j=1,2,\ldots T_1, k=1,2 \ldots T_1 \quad (16)$$

with $T_1$ denoting the size of the prediction filter tap.

At block 725, the method 700 generates a predicted frame using the prediction filter and the decimated frame.

At block 730, the method 700 generates classes for the decimation filter from the target frame. The decimation classes may be defined on the original input data, or on the decimated data itself. The following process applies to deriving an adaptive decimation filter using a single class (monoclass). Deriving a multi-class adaptive decimation filter is described in greater detail below in conjunction with FIGS. 13-15.

At block 735, the method 700 extracts a classified decimation filter while holding the prediction filter fixed. The method 700 derives the decimation filter from the minimization of the prediction error, keeping the prediction filter fixed. The prediction for the pixel $\bar{x}$ may be defined as:

$$P(\vec{x}) = \sum_j L_j^u I^D\left(\vec{y}_j^{\vec{x}}\right) \quad (17)$$

the prediction filter class map for the pixel $\bar{x}$ may be defined as, $$u = S(\vec{x}) \quad (18)$$

the decimated image may be defined as:

$$I^D(\vec{y}_j^{\vec{x}}) = \sum_n H_n I\left(\vec{z}_n^{\vec{y}_j^{\vec{x}}}\right) \quad (19)$$

the prediction for the pixel $\bar{x}$ expressed in terms of the decimation filter may be defined as:

$$P(\vec{x}) = \sum_j L_j^u \sum_n H_n I\left(\vec{z}_n^{\vec{y}_j^{\vec{x}}}\right) \quad (20)$$

and the prediction error may be defined as:

$$e = \sum_{\vec{x}} (I(\vec{x}) - P(\vec{x}))^2 \quad (21)$$

Accordingly, the method 700 extracts the decimation filter H from prediction error minimization with a fixed prediction filter, as follows:

$$\frac{\delta e}{\delta H_m}\bigg|_L = 0 \quad (22)$$

$$\sum_{\vec{x}} (I(\vec{x}) - P(\vec{x})) \sum_j L_j^u \sum_n \frac{\delta H}{\delta H_m} I(\vec{z}_n^{\vec{y}_j^{\vec{x}}}) = 0 \quad (23)$$

$$\sum_{\vec{x}} (I(\vec{x}) - P(\vec{x})) \sum_j L_j^u I(\vec{z}_m^{\vec{y}_j^{\vec{x}}}) = 0 \quad (24)$$

$$\sum_{\vec{x}} \sum_j I(\vec{x}) L_j^u I(\vec{z}_m^{\vec{y}_j^{\vec{x}}}) = \sum_{\vec{x}} \sum_j \sum_k L_k^u \sum_n H_n I(\vec{z}_n^{\vec{y}_k^{\vec{x}}}) L_j^u I(\vec{z}_m^{\vec{y}_j^{\vec{x}}}) \quad (25)$$

$$\sum_{\vec{x}} I(\vec{x}) F_m(\vec{x}) = \sum_n H_n \sum_{\vec{x}} F_n(\vec{x}) F_m(\vec{x}) \quad (26)$$

where $$F_m(\vec{x}) = \sum_j L_j^u I(\vec{z}_m^{\vec{y}_j^{\vec{x}}}) \quad (27)$$

The decimation filter H is given by:

$$H = (A)^{-1} b \quad (28)$$

where $$A_{n,m} = \sum_{\vec{x}} F_n(\vec{x}) F_m(\vec{x}) \quad (29)$$

defines the correlation matrix and $$b_m = \sum_{\vec{x}} I(\vec{x}) F_m(\vec{x}) \quad (30)$$

defines the observation vector. The indexes {m,n} run over the decimation filter taps:

$$m=1,2,\ldots T_2, n=1,2\ldots T_2 \qquad (3)$$

with $T_2$ denoting the size of the decimation filter tap.

The method 700 generates the decimation filter H using the least squares solutions above, given the fixed classified prediction filter. The function $F_n(\vec{x})$ incorporates the effect of the classified prediction filter which the method 700 generates at block 720. The function $F_n(\vec{x})$ provides a weighted average of the original data and the classified prediction filter L from block 720. The weighted average is over all of the tap positions {j} of the classified prediction filter.

$$F_n(\vec{x}) = \sum_j L_j^{S(\vec{x})}(\vec{z}_n^{\vec{y}_j}) \qquad (32)$$

The function $F_n(\vec{x})$ may be referred to as the L-weighted input signal. At decision 740, the method 700 determines whether to further optimize the filters or to terminate. In one embodiment, the method 700 may repeat the process a predetermined number of times. Empirically, the result saturates after 4 or 5 passes using a decimation factor of 1/9, so the method 700 may terminate after 4 or 5 passes.

Figure 8:
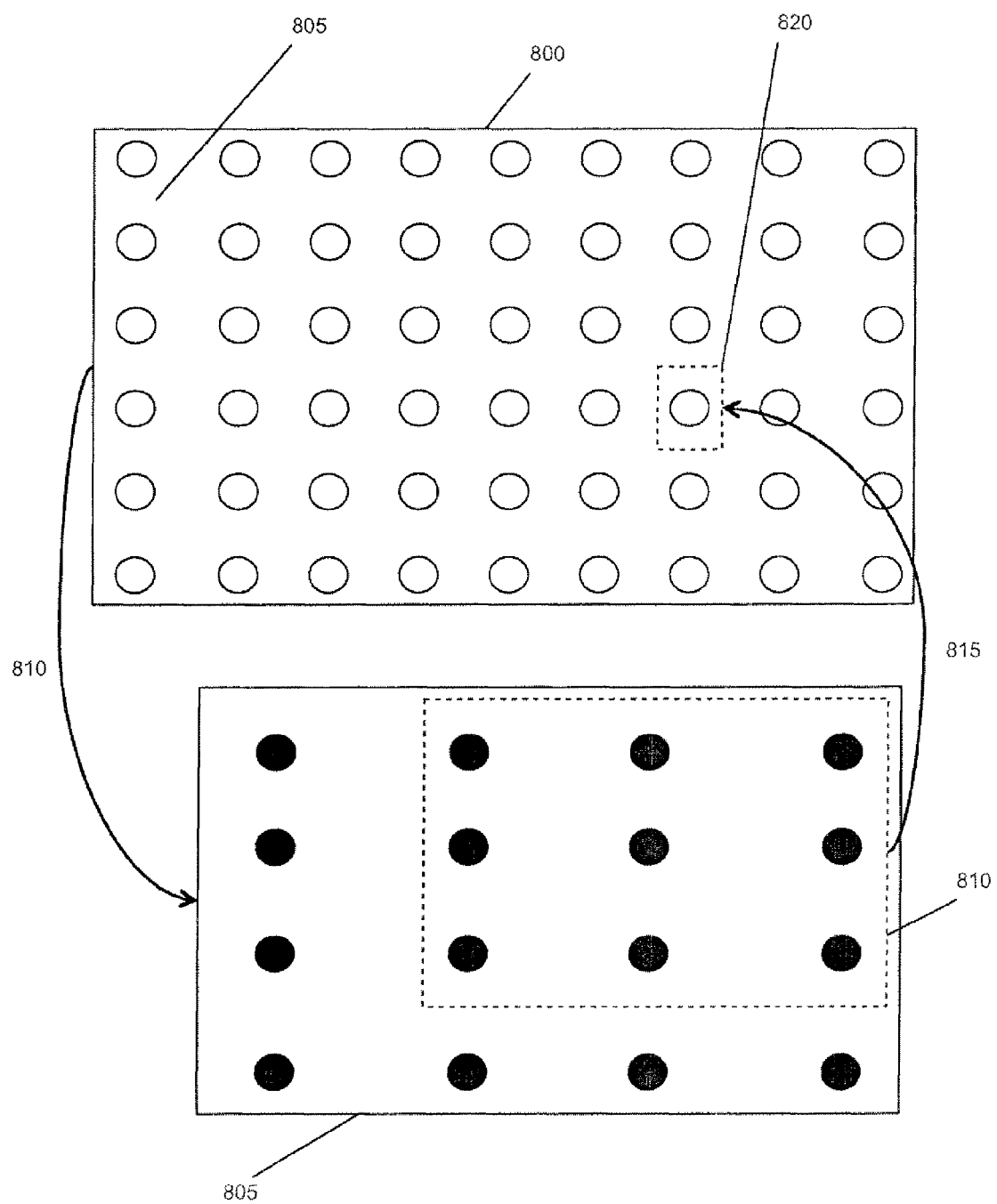
FIG. 8 is a diagram illustrating the operation of an adaptive decimation filter according to an embodiment of the invention.

FIG. 8 is a diagram illustrating the optimization of a two-dimensional (2D) prediction filter and a declination filter. The prediction filter is 2D in that it generates a predicted frame using only decimated pixels from the same time instant as the target (predicted) frame. Decimation filter 810 generates decimated frame 805 from original frame 800. 2D prediction filter 815 uses decimated pixel tap 810 to reconstruct target pixel 820.

Figure 9:
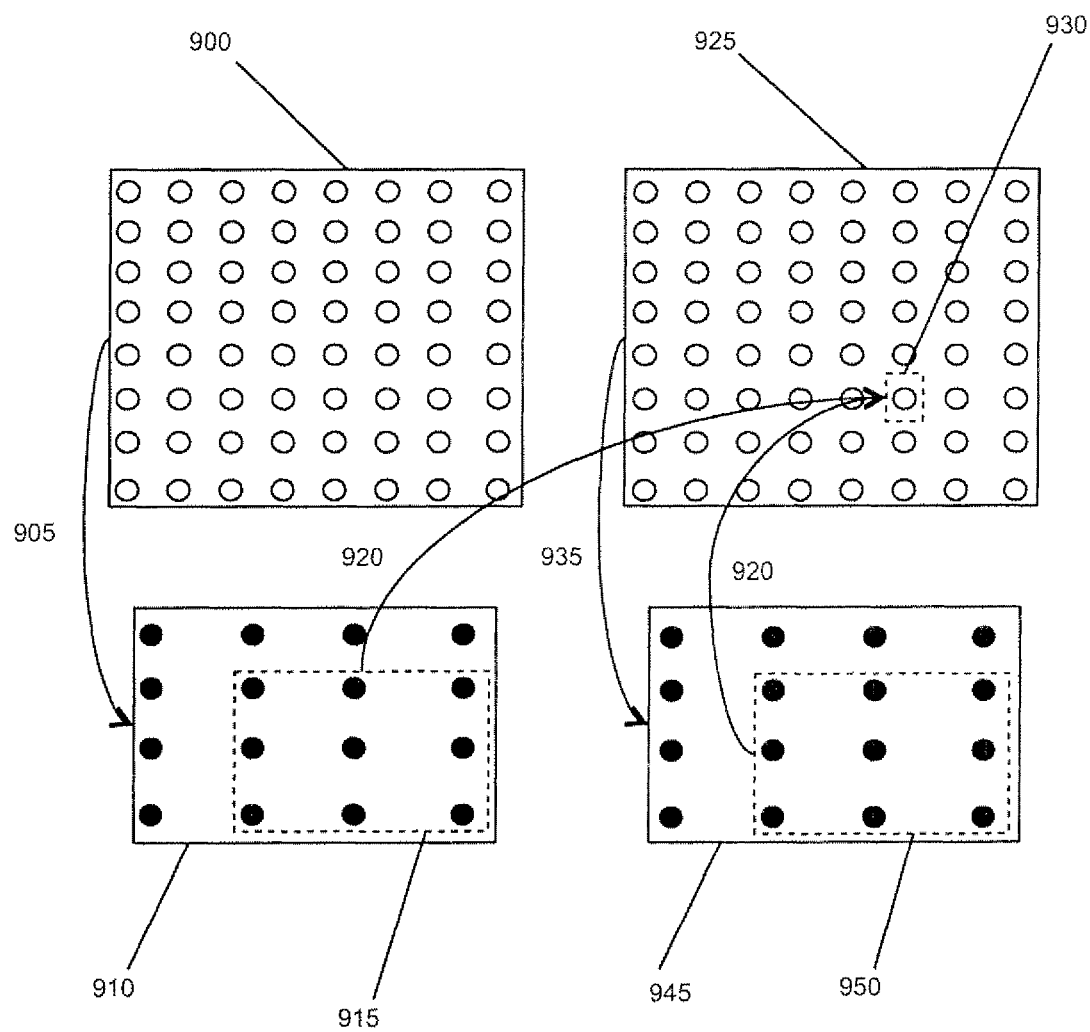
FIG. 9 is a diagram illustrating the operation of an adaptive decimation filter according to an embodiment of the invention.

FIG. 9 is a diagram illustrating the optimization of a three-dimensional (3D) prediction filter and decimation filter for progressive/non-interlaced video frames. Decimation filters 905 and 935 generate decimated frames 910 and 945 from original frames 900 and 925. Prediction filter 920 is 3D in that it uses decimated taps in the decimated frame corresponding to the target frame and in at least one decimated frame offset in time from the target frame. For example, prediction filter 920 uses decimated pixel tap 915 from offset decimated frame 910 and decimated pixel tap 950 in decimated frame 945 to reconstruct target pixel 930.

Figure 10:
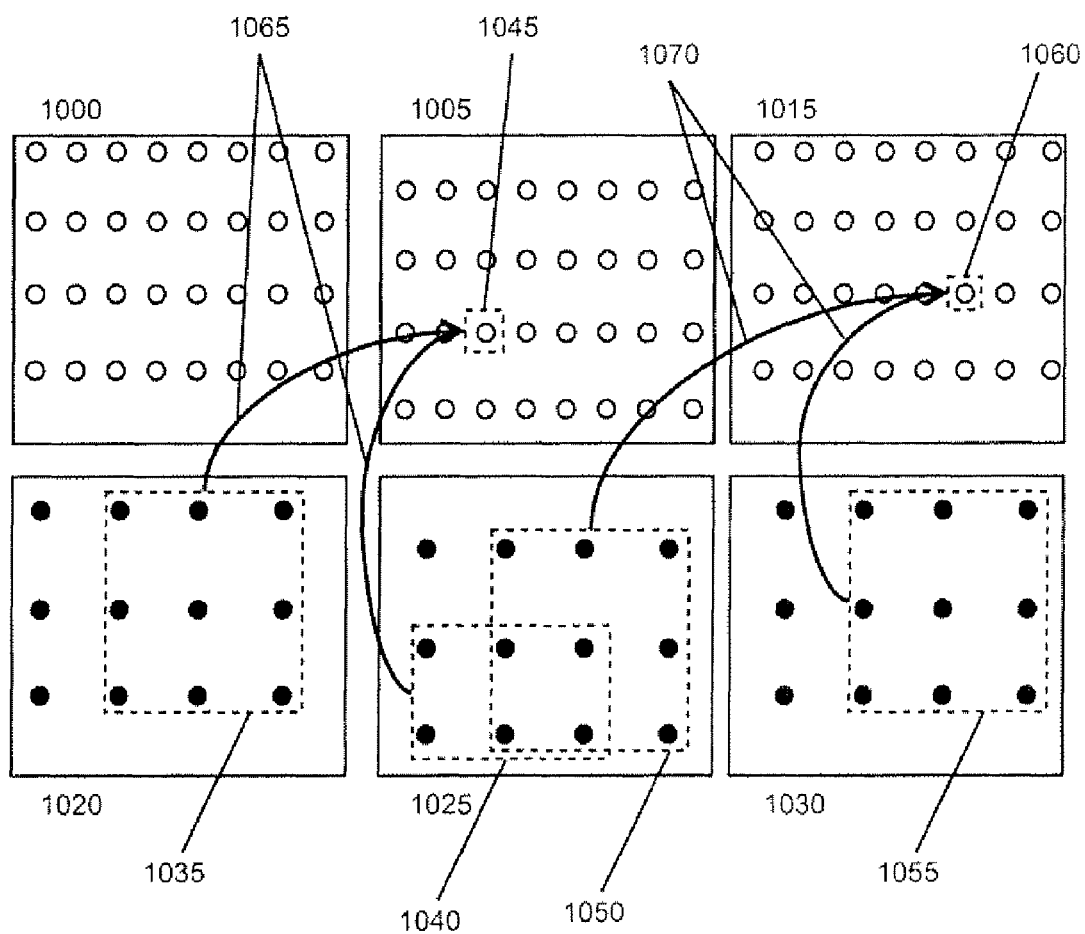
FIG. 10 is a diagram illustrating the operation of an adaptive decimation filter according to an embodiment of the invention.

FIG. 10 is a diagram illustrating the optimization of three-dimensional (3D) prediction filters and decimation filters for interlaced video data where the frame is separated into two fields, offset vertically. Generally, the two fields from a given frame are separated in time by 1/60 of a second and are shifted vertically by one row of pixels. Each frame of video data is represented by two fields of interlaced video data. In FIG. 10, fields 1005 and 1015 form the target frame. In this embodiment, each field has a corresponding decimation filter. Fields 1005 and 1015 in the target frame have a corresponding 3D prediction filter. Prediction filter 1065 generates target pixel 1045 using decimated pixel taps 1035 and 1040 in decimated fields 1020 and 1025. Decimated field 1025 corresponds chronologically to the target field 1005. Decimated field 1020 corresponds chronologically to the second field 1000 of the previous frame of video data. Prediction filter 1070 generates target pixel 1060 using decimated pixel taps 1055 and 1050 in decimated fields 1030 and 1025, respectively. Decimated pixel tap 1055 corresponds chronologically to the target field 1015, while decimated pixel frame 1050 corresponds chronologically to the previous field 1005 in the target frame.

Figure 7A:
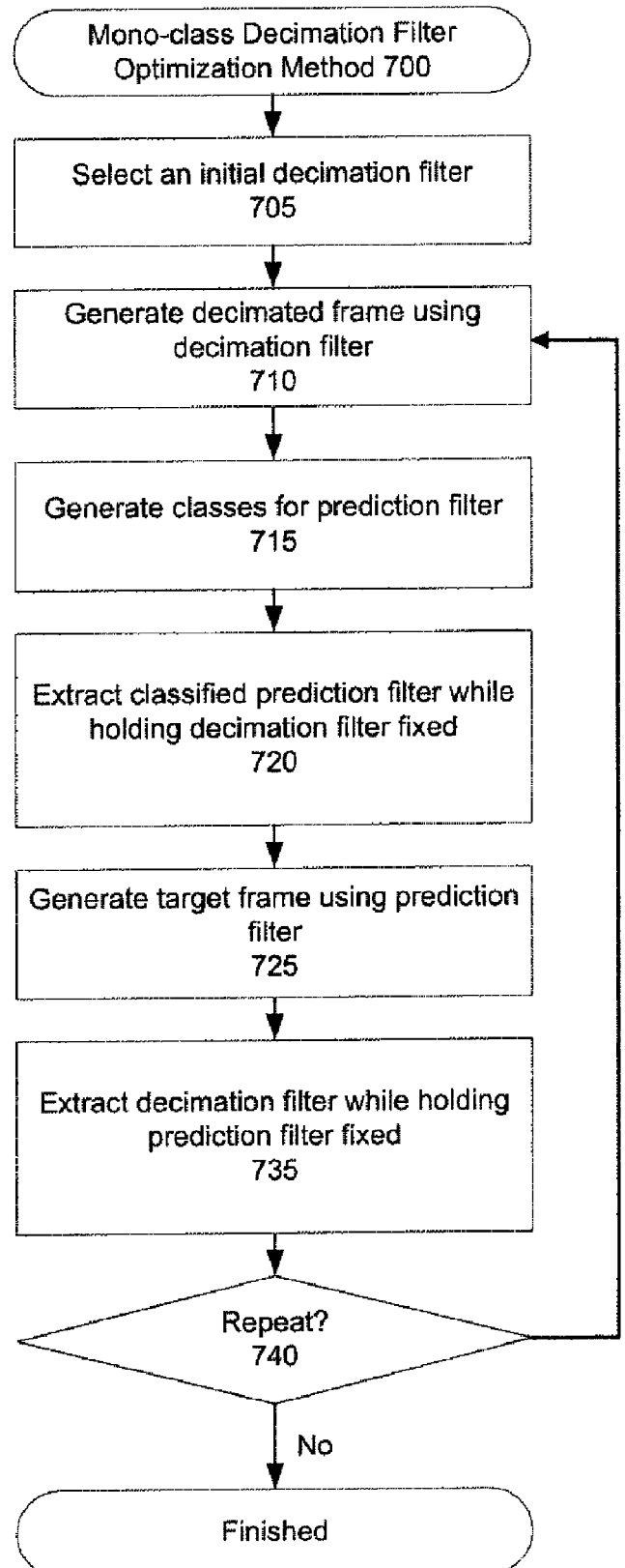
FIGS. 7A and 7B are flow diagrams of filter optimization methods to be performed by a computer according to embodiments of the invention.
Figure 7B:
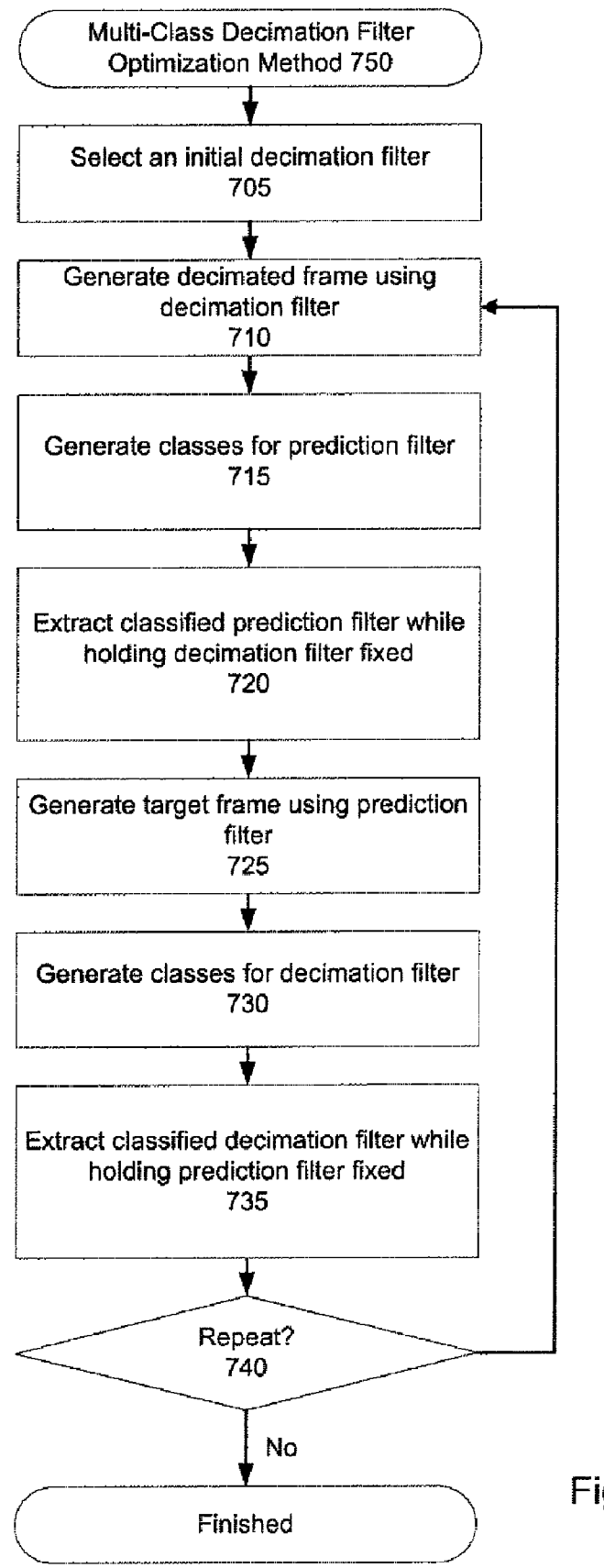

FIG. 7B is a flow diagram illustrating a method of optimizing classified adaptive decimation filters according to an embodiment of the invention. FIGS. 7A and 7B in that FIG. 713 incorporates block 730. At block 730, the method 750 generates classes for the decimation filter. Also, at block 735, the method extracts a classified filter using the classes. Prediction using classified decimation filters may be defined as:

$$P(\vec{x}) = \sum_j L_j^u I^D(\vec{y}_j) \qquad (33)$$

where the prediction map is given by:

$$u = S(\vec{x}) \qquad (34)$$

The decimated image is given by:

$$I^D(\vec{y}_j) = \sum_n H_n^v I(\vec{z}_n^{\vec{y}_j}) \qquad (35)$$

The decimation class map is:

$$v = D(\vec{y}_j, \vec{x}) \qquad (36)$$

The prediction may be expressed in terms of the decimation filter as:

$$P(\vec{x}) = \sum_j L_j^u \sum_n H_n^v I(\vec{z}_n^{\vec{y}_j}) \qquad (37)$$

The prediction error is the difference between the image to be predicted and the prediction:

$$e = \sum_{\vec{x}} (I(\vec{x}) - P(\vec{x}))^2 \qquad (38)$$

The prediction error is a function of the prediction and decimation filters, and the prediction and decimation class map. This dependency is expressed as e(L, H, C, D). The class maps are usually fixed and determined by some other method, so the dependency of the prediction error on the filters only is expressed as: e(L, H). In other embodiments other classification methods may be used.

The multiple classified decimation filters {H$^v$, v=0,1,2 ... M-1} are derived from the minimization of the prediction error. This minimization is obtained by setting the variation of the prediction error to zero while keeping the prediction error fixed:

$$\left.\frac{\delta e(L, H)}{\delta H_m^t}\right|_L = 0 \qquad (39)$$

Therefore, the mono-class decimation described above primarily in conjunction with FIG. 7 may be extended to multi-class decimation using the following process:

$$\sum_{\vec{x}} (I(\vec{x}) - P(\vec{x})) \sum_{j} L_j^u \sum_{n} \frac{\delta H_n^v}{\delta H_m^t} I(z_n^{\vec{y_j}}) = 0 \quad (40)$$

$$\sum_{\vec{x}} (I(\vec{x}) - P(\vec{x})) \sum_{\{j|t=D(\vec{y_j})\}} L_j^u I(z_m^{\vec{y_j}}) = 0 \quad (41)$$

Applying the prediction defined in equation 37, the following is obtained for equation 40:

$$\sum_{\vec{x}} \sum_{\{j|t=D(\vec{y_j})\}} I(\vec{x}) L_j^u I(z_m^{\vec{y_j}}) = \quad (42)$$

$$\sum_{\vec{x}} \sum_{k} L_k^u \sum_{n} H_n^v I(z_n^{\vec{y_k}}) \sum_{\{j|t=D(\vec{y_j})\}} L_j^u I(z_m^{\vec{y_j}})$$

Which may also be expressed as:

$$\sum_{\vec{x}} I(\vec{x}) F_m^t(\vec{x}) = \sum_{n} H_n^t \sum_{\vec{x}} F_n^t(\vec{x}) F_m^t(\vec{x}) + G_m^t(\{H^{v \ne t}\}) \quad (43)$$

Where:

$$F_m^t(\vec{x}) = \sum_{\{j|t=D(\vec{y_j})\}} L_j^u I(z_m^{\vec{y_j}}) \quad (44)$$

The last term in equation 43 is a class-coupling term, defined as:

$$G_m^t(\{H^{v \ne t}\}) = \sum_{x} F_m^t(\vec{x}) \sum_{\{k|v \ne t\}} L_k^u \sum_{n} H_n^v I(z_n^{\vec{y_k}}) \quad (45)$$

Where the decimation class index v in equation in 45 is determined by the class map as follows.

$$v = D(y_h^{\vec{x}}) \quad (46)$$

The solution structure in equation 43 has the form:

$$b_m^t = \sum_{n} H_n^t A_{n,m}^t + G_m^t(\{H^{v \ne t}\}) \quad (47)$$

Where the $b^t$ term is an observation vector for decimation class t:

$$b_n^t = \sum_{\vec{x}} F_m^t(\vec{x}) I(\vec{x}) \quad (48)$$

And the $A^t$ term is a correlation matrix for decimation class t:

$$A_{n,m}^t = \sum_{\vec{x}} F_n^t(\vec{x}) F_m^t(\vec{x}) \quad (49)$$

The indexes $\{m, n\}$ run over the decimation filter taps m=0, 1, . . . T−1, n=0, 1 . . . T−1, with T denoting the size of the decimation filter tap. The indexes $\{j, k\}$ run over the prediction filter taps. The solution structure is valid for any three-dimensional classified prediction and decimation filter. In other words, it is valid for any number of classes, and for any prediction class map $u=S(\vec{x})$ and decimation class map: $v=D(\vec{y})$.

The solution for the multiple class decimation filters is given by equation 47, with the definition of the $G^t$ term given in equation 45. The $G^t$ term couples the filters from different decimation classes. $G^t$ is designated a class-coupling term because it does not allow for each class to be solved independently. The class-coupling term increases the complexity extracting the decimation filters.

The function $F_m^t(\vec{x})$ is a quantity that incorporates the effect of the classified prediction filter. This function is referred to as the L-weighted input signal and is a sum of the input signal $I(Z_m^{\vec{y_j x}})$ weighted with the prediction filter coefficient $L_j^u$. This sum is over all the prediction filter tap positions $y_j^{\vec{x}}$ that belong to the same decimation class $t=D(y_j^{\vec{x}})$. For a given target pixel $\vec{x}$, $F_m^t(\vec{x})$ may be zero for some classes.

The mono-class decimation filter described above primarily in conjunction with FIG. 7 is given by the matrix inversion of the correlation matrix $H=(A)^{-1}b$ as follows, where the correlation matrix is defined:

$$A_{n,m} = \sum_{\vec{x}} F_n(\vec{x}) F_m(\vec{x}) \quad (50)$$

and the observation vector is defined:

$$b_m = \sum_{\vec{x}} I(\vec{x}) F_m(\vec{x}) \quad (51)$$

where $$F_n(\vec{x}) = \sum_{j} L_j^u I(z_n^{\vec{y_i x}}) \quad (52)$$

is the L-weighted input signal for the mono-class case. Equation 52 is the least squares solution for extracting an optimized mono-class decimation filter, given some classified prediction filter. The least squares training solution may include computing the correlation matrix and observation vector over a set of samples, where the set of samples is all the pixels belonging to the class being considered. In the mono-class case, all the pixels are used, since there is only one class for the entire image. The least squares solution yields a stable solution as long as the set of samples is large enough for each filter case.

Figure 12:
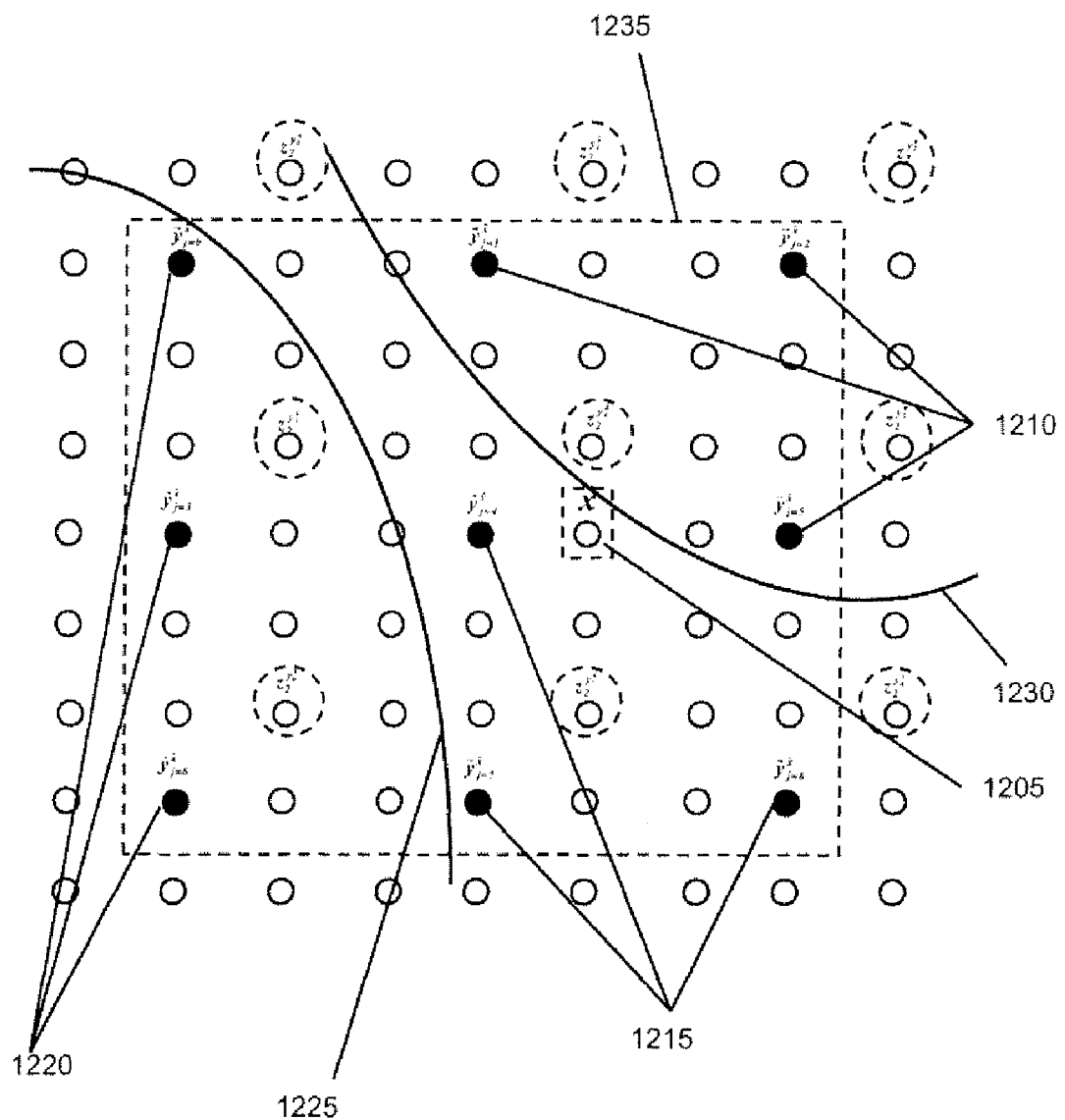
FIG. 12 is a diagram of a classified adaptive decimation filter according to an embodiment of the invention.

The class-coupling term does not allow for a direct solution for each class. In other words, the decimation filters for each class cannot be solved independently. FIG. 12 illustrates the dependence of the prediction of a pixel from multiple classes. Pixel 1205 is the pixel to be predicted with a prediction filter using a 9 pixel tap. The pixel tap for pixel 1205 includes pixels 1210 from a first decimation class, pixels 1215 from a second decimation class, and pixels 1220 from a third decimation class. FIG. 12 graphically illustrates the class-coupling term. Border 1225 divides class 0 from class 1. Border 1230 divides class 1 from class 2.

The prediction filter for the target pixel 1205 is expressed as:

$$P(\vec{x}) = \sum_{j=0}^{8} L_j^u I^D(\vec{y}_j^x) = \sum_{j=0}^{8} L_j^u \sum_n H_n^v I(\vec{z}_n^{\vec{y}_j^x}) \qquad (53)$$

where $H_n^v$ is the classified decimation Filter for class v at tap position n. This prediction may be separated into the contributions from the different classes shown in FIG. 7b:

$$P(\vec{x}) = \sum_{j=0,3,6} L_j^u \sum_n H_n^0 I(\vec{z}_n^{\vec{y}_j^x}) + \qquad (54)$$
$$\sum_{j=4,7,8} L_j^u \sum_n H_n^1 I(\vec{z}_n^{\vec{y}_j^x}) + \sum_{j=1,2,5} L_j^u \sum_n H_n^2 I(\vec{z}_n^{\vec{y}_j^x})$$

this shows how the prediction for each target pixel is influenced by multiple decimation classes. This is the source of the class coupling term, G.

The L-weighted input signal $F_m^t(\vec{x})$ for decimation filter tap position 1235 may be defined as:

$$F_m^t(\vec{x}) = \sum_{\{j|t=D(\vec{y}_j^x)\}} L_j^u I(\vec{z}_m^{\vec{y}_j^x}) \qquad (55)$$

where:

$$F_2^0(\vec{x}) = L_0^u I(\vec{z}_2^{\vec{y}_0^x}) + L_3^u I(\vec{z}_2^{\vec{y}_3^x}) + L_6^u I(\vec{z}_2^{\vec{y}_6^x}) \qquad (56)$$

$$F_2^1(\vec{x}) = L_4^u I(\vec{z}_2^{\vec{y}_4^x}) + L_7^u I(\vec{z}_2^{\vec{y}_7^x}) + L_8^u I(\vec{z}_2^{\vec{y}_8^x}) \qquad (57)$$

$$F_2^2(\vec{x}) = L_1^u I(\vec{z}_2^{\vec{y}_1^x}) + L_2^u I(\vec{z}_2^{\vec{y}_2^x}) + L_5^u I(\vec{z}_2^{\vec{y}_5^x}) \qquad (58)$$

such that:

$$F_2^t(\vec{x})=0 \; t>2 \qquad (59)$$

where equation 54 represents the contribution of class zero, equation 55 represents the contribution of class one, and equation 56 represents the contribution of class two to the L-weighted input signal.

This is unlike the case of multi-class prediction, where the prediction filters for each class may be solved independently. For multi-class prediction, the solution is the same matrix structure for each class, similar to the mono-class decimation filter case.

Figure 13:
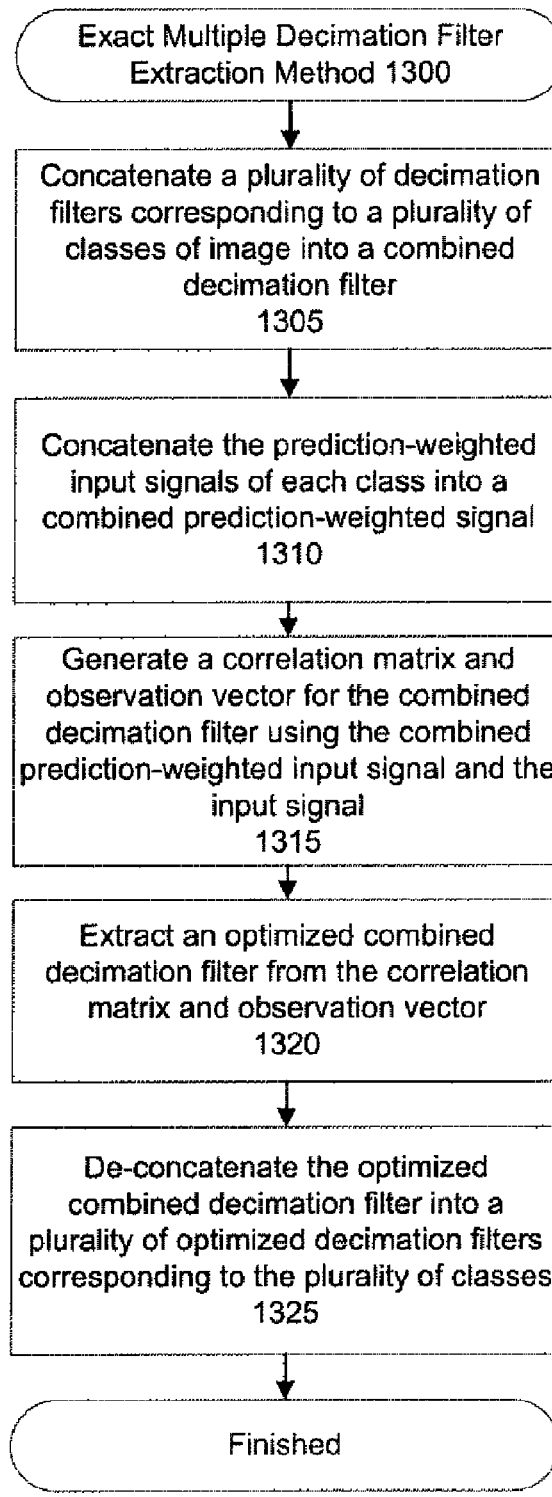
FIG. 13 is a flow diagram of a multiple decimation filter extraction method to be performed by a computer according to an embodiment of the invention.

FIG. 13 illustrates multiple decimation filter extraction using an exact process. In one embodiment, the method 500 may execute the method 1300 at block 520. At block 1305, the method concatenates the decimation filters for each class into a single combined decimation filter. This combined filter may be obtained exactly from a matrix inverse solution. The combined decimation filter may be defined as:

$$\{H_n^{t=0}, H_n^{t=1}, \ldots H_n^{t=M-1}\} \rightarrow \hat{H}_{tT+n} = \hat{H}_p \qquad (60)$$

The index t runs over the number of classes t=0, 1, 2 ... M−1, where M is the total number of classes. The index n runs over the decimation filter taps n=0, 1, 2 ... T−1 where T is the total number of taps. The index p runs over all the elements of the combined filter p=0, 1, 2 ... MT−1. Since the combined filter embodies all classes, no class-coupling term is present. At block 1310, the method generates the L-weighted input signal as follows:

$$\{F_m^0, F_m^1, \ldots F_m^{t=M-1}\} \rightarrow \hat{F}_{p=tT+m} = \hat{F}_p \qquad (61)$$

where $$\hat{F}_p = \hat{F}_{p=tT+m} = \sum_{\{j|t=D(\vec{y}_j^x)\}} L_j^u I(\vec{z}_m^{\vec{y}_j^x}) \qquad (62)$$

At block 1315, the method extends the observation vector and correlation matrix into one joint vector and matrix for all classes. The solution equation for the combined filter has the matrix form:

$$\hat{b}_q = \sum_n \hat{H}_p \hat{A}_{p,q} \qquad (63)$$

where the observation vector and correlation matrix are defined as:

$$\hat{b}_q = \sum_{\vec{x}} I(\vec{x}) \hat{F}_q(\vec{x}) \qquad (64)$$

$$\hat{A}_{p,q} = \sum_{\vec{x}} \hat{F}_p(\vec{x}) \hat{F}_q(\vec{x}) \qquad (65)$$

At block 1320, the method extracts the solution for the combined decimation filter by direct matrix inversion:

$$\hat{H} = (\hat{A})^{-1} \hat{b} \qquad (66)$$

At block 1325, the method de-concatenates the decimation filter coefficients for each class $H_n^t$ are from the combined filter, $$\hat{H}_p = \hat{H}_{tT+n} \rightarrow \{H_n^{t=0}, H_n^{t=1}, \ldots H_n^{t=M-1}\} \qquad (67)$$

The class-coupling term is incorporated into the combined L-weighted input signal. The solution structure for the extended decimation filter is simply a matrix inversion.

The exact solution involves inverting the extended correlation matrix, which has a size of MT×MT. For some cases, the number of taps may exceed 100 for a multi-field tap, and the number of classes may exceed 128. The produces a large matrix with a correspondingly costly inversion operation. In certain applications, such as HDTV (high definition TV) or UDTV (ultra definition TV), the complexity cost may exceed available computational resources.

Figure 14:
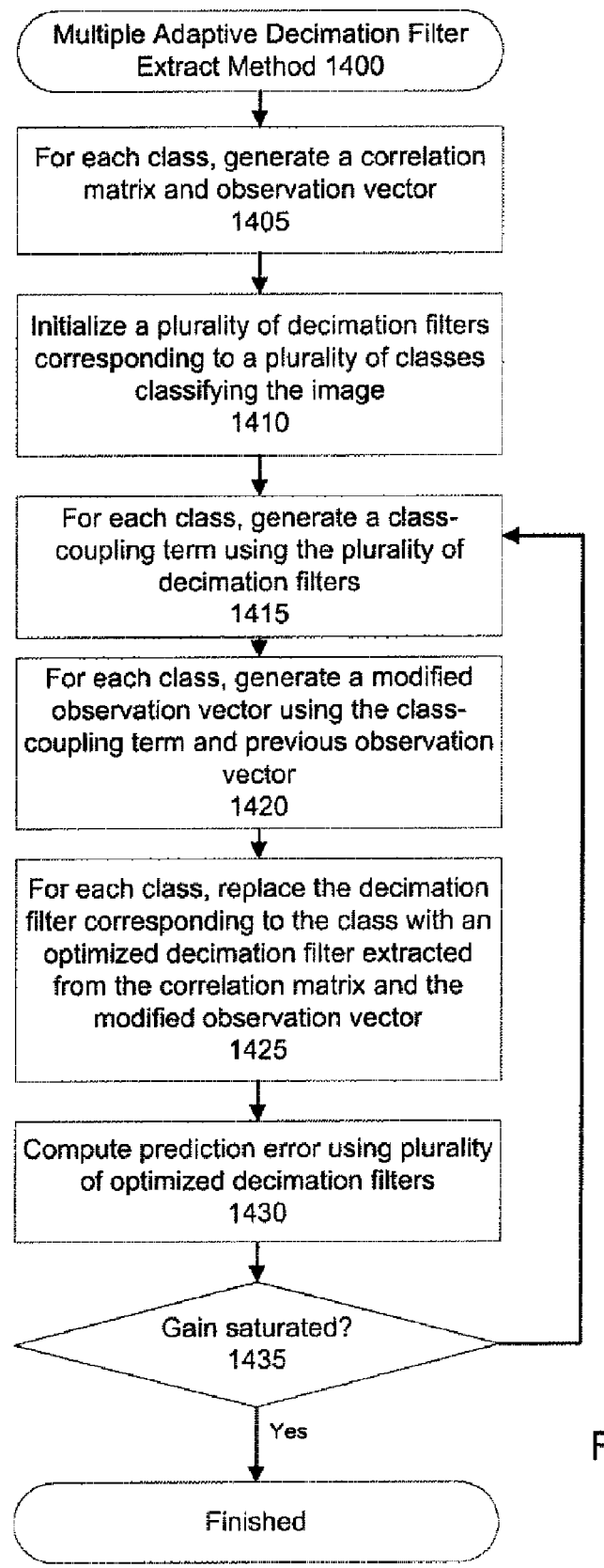
FIG. 14 is a flow diagram of another multiple decimation filter extraction method to be performed by a computer according to an embodiment of the invention.

FIG. 14 illustrates another method of extracting multiple decimation filters according to an embodiment of the invention. In one embodiment, the method 500 may execute the method 1400 at block 520. The method reduces the complexity of the exact method illustrated in FIG. 13 by only inverting matrixes for each class. This approximate method treats the class-coupling term as a modified observation vector. The method performs multiple passes to converge on a solution with lower, but similar, performance to the exact method illustrated in FIG. 13.

The solution for the multiple decimation filters may be defined as:

$$b_m^t = \sum_n H_n^t A_{n,m}^t + G_m^t(\{H^{v \ne t}\}) \quad (68)$$

At block 1405, the method generates a correlation matrix and observation vector for each class. At block 1410, the method generates some initial values of the decimation filters (described below in greater detail in conjunction with FIG. 15), and incorporates the class coupling term as a modification of the observation vector:

$$\tilde{b}_m^t = b_m^t - G_m^t(\{\tilde{H}^{v \ne t}\}) \quad (69)$$

The solution for the multiple declination filters takes the form:

$$\tilde{b}_m^t = \sum_n H_n^t A_{n,m}^t \quad (70)$$

The method obtains the solution for the decimation filter for each class t as:

$$H^t = (A^t)^{-1} \tilde{b}^t \quad (71)$$

At block 1415, the method uses the decimation filter for each class to update the class-coupling term. At block 1420, the method generates a modified observation vector. At block 1425, the method uses the modified observation vector to obtain a new solution for the classified decimation filters. At block 1430, the method determines the prediction error given the new decimation filters. At block 1435, the method repeats this process for some number of iterations. Empirical data indicates that the prediction improvement saturates after 2-3 iterations. The prediction error at each stage may be computed to evaluate the effectiveness of the decimation filters at each pass. The complexity for this approximate process is order $\sim 2M(T)^\lambda$ where $\lambda$ is a number between $\sim 2.4$ and 3 depending on the matrix inversion method. This compares favorably with extraction method illustrated in FIG. 13, which has an order of complexity of $\sim (MT)^\lambda$, especially for large number of classes M.

Figure 15:
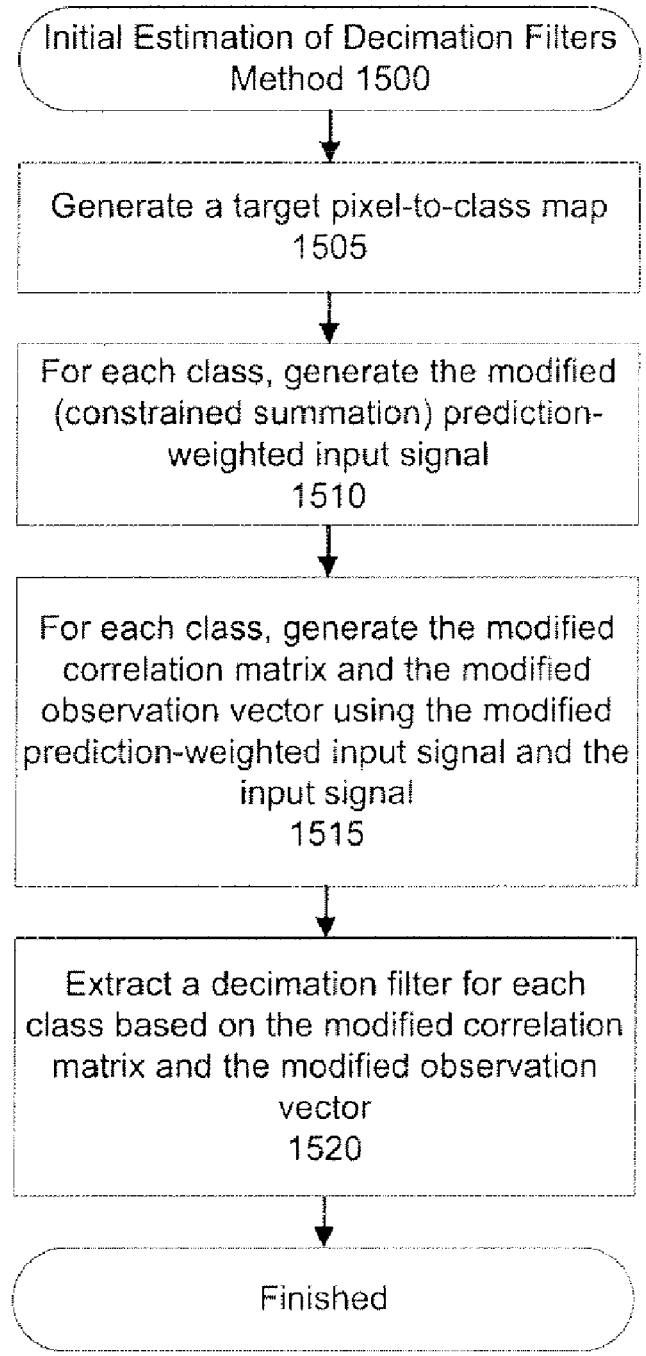
FIG. 15 is a flow diagram of an initial estimation of decimation filters method to be performed by a computer according to an embodiment of the invention.

FIG. 15 illustrates a method of estimating initial decimation filters 1500 according to an embodiment of the invention. The prediction for a target pixel may involve multiple decimation classes, because the decimation class map is defined on the decimated data as $$v = D(y_j^{\vec{x}}) \quad (72)$$

where $\vec{x}$ is the target pixel and $\{j\}$ is the prediction filter tap index. As the tap index j runs over the prediction filter tap, each decimated data point $y_j^{\vec{x}}$ may have a different class assigned to it, from the class map D. The multiple classes associated with the target pixel generates the class-coupling term.

The method introduces an initial estimation of the decimation filters with a map that assigns each target pixel to one decimation class. The method may use different types of assignments. At block 1505, the method obtains a target pixel-to-decimation class map as follows:

$$v = R(\vec{x}) \quad (73)$$

For example:

$$R(\vec{x}) = D(y_{j_{select}}^{\vec{x}}) \quad (74)$$

where $$j_{select} = \sup_j\{|L_j^u|\} \quad (75)$$

The target pixel-to-decimation map means that for the target pixel $\vec{x}$, the method uses the class associated with the decimated data $y_j^{\vec{x}}$ that has the largest prediction filter coefficient. The largest prediction filter coefficient is found over all the prediction filter tap positions indexed by j. In other embodiments, other definitions for associating a decimation class with a target pixel may be used. At block 1510, the method generates a modified input signal from image and prediction filters. The method generates a modified input signal for each class.

The method uses the target pixel-to-decimation class map to simplify the extraction of the decimation filters. The class coupling term is zero, and the solution has the form:

$$b_m^t = \sum_n H_n^t A_{n,m}^t \quad (76)$$

At block 1515, the method modifies the correlation matrix and observation vector to contain the constraint from the map $R(\vec{x})$. The modification is in the summation over the target pixels. The summation is now only over a partition of the full input space. In other words, only target pixels corresponding to a specific decimation class are summed.

Mathematically, the method modifies the observation vector and correlation matrix as follows:

$$b_n^t = \sum_{\{\vec{x} | t = R(\vec{x})\}} I(\vec{x}) F_m^t(\vec{x}) \quad (77)$$

$$A_{n,m}^t = \sum_{\{\vec{x} | t = R(\vec{x})\}} F_n^t(\vec{x}) F_m^t(\vec{x}) \quad (78)$$

where the modified L-weighted input signal is defined as:

$$F_m^t(\vec{x}) = \sum_{\{j_{select}(\vec{x})\}} L_j^u I(\vec{z}_m^{\vec{y}_j^{\vec{x}}}) \quad (79)$$

At block 1520, the method obtains the solution for the multiple decimation filters as follows:

$$H^t = (A^t)^{-1} b^t \quad (80)$$

and extracts an initial decimation filter for each class from the modified correlation matrix and the modified correlation vector.

Figure 11A:
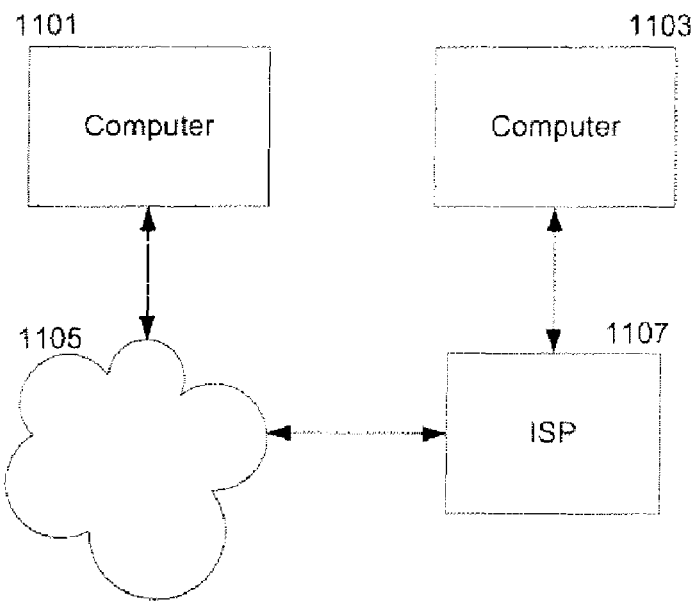
FIGS. 11A and 11B are diagrams of a computer environment suitable for practicing the invention.

In one embodiment, as shown in FIG. 11A, a server computer 1101 is coupled to, and provides data through, the Internet 1105. A client computer 1103 is coupled to the Internet 1105 through an ISP (Internet Service Provider) 1107 and executes a conventional Internet browsing application to exchange data with the server 1101. Optionally, the server 1101 can be part of an ISP which provides access to the Internet for client systems. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet allows users of client computer systems to exchange information, receive and send e-mails, view documents, such as documents which have been prepared in the HTML format, and receive content. It is readily apparent that the present invention is not limited to Internet access and Internet web-based sites; directly coupled and private networks are also contemplated.

Figure 11B:
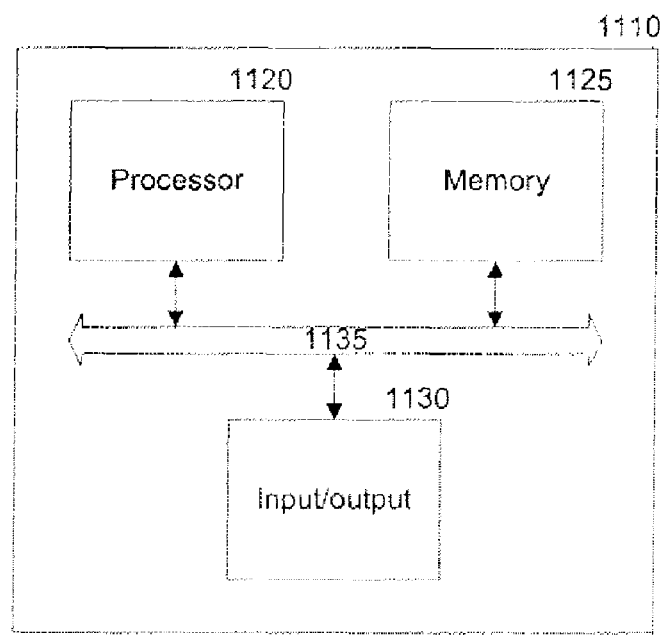

One embodiment of a computer system suitable for use as server 1101 is illustrated in FIG. 11B. The computer system 1110, includes a processor 1120, memory 1125 and input/output capability 1130 coupled to a system bus 1135. The memory 1125 is configured to store instructions which, when executed by the processor 1120, perform the methods described herein. The memory 1125 may also store data for adaptive decimation filtering. Input/output 1130 provides for the delivery and display of the data for adaptive decimation filtering or portions or representations thereof, and also the input of data of various types for storage, processing or display. Input/output 1130 also encompasses various types of machine-readable storage media, including any type of storage device that is accessible by the processor 1120. One of skill in the art will immediately recognize that the server 1101 is controlled by operating system software executing in memory 1125. Input/output 1130 and related media store the machine-executable instructions for the operating system and methods of the present invention as well as the data for an adaptive decimation filter.

The description of FIGS. 11A-B is intended to provide an overview of computer hardware and other operating components suitable for implementing the invention, but is not intended to limit the applicable environments. It will be appreciated that the computer system 1110 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

An adaptive decimation filter has been described. Although specific embodiments have been illustrated and described herein it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computerized method comprising:
concatenating a plurality of initial decimation filters into an initial combined decimation filter, wherein the plurality of initial decimation filters are assigned to a plurality of classes, the plurality of classes associating the plurality of initial decimation filters with a plurality of regions of an image to be predicted;
generating an input signal from the initial combined decimation filter, wherein the input signal is weighted with a plurality of prediction filters;
generating a correlation matrix for the initial combined decimation filter from the input signal;
generating an observation vector for the initial combined decimation filter from the input signal;
extracting an optimized combined decimation filter from the correlation matrix and the observation vector, the optimized combined decimation filter comprising a plurality of optimized decimation filters; and
de-concatenating the optimized combined decimation filter into the plurality of optimized decimation filters.

2. A non-transitory computer-readable storage medium storing instructions which when executed by a data processing system cause the data processing system to perform operations that process data, the operations comprising:
concatenating a plurality of initial decimation filters into an initial combined decimation filter, wherein the plurality of initial decimation filters are assigned to a plurality of classes, the plurality of classes associating the plurality of initial decimation filters with a plurality of regions of an image to be predicted;
generating an input signal from the initial combined decimation filter, wherein the input signal is weighted with a plurality of prediction filters;
generating a correlation matrix for the initial combined decimation filter from the input signal;
generating an observation vector for the initial combined decimation filter from the input signal;
extracting an optimized combined decimation filter from the correlation matrix and the observation vector, the optimized combined decimation filter comprising a plurality of optimized decimation filters; and
de-concatenating the optimized combined decimation filter into the plurality of optimized decimation filters.

3. A system comprising:
a processor coupled to a bus;
a memory coupled to the processor through the bus, and
instructions executed by the processor from the memory to cause the processor to
concatenate a plurality of initial decimation filters into an initial combined decimation filter, wherein the plurality of initial decimation filters are assigned to a plurality of classes, the plurality of classes associating the plurality of initial decimation filters with a plurality of regions of an image to be predicted;
generate an input signal from the initial combined decimation filter, wherein the input signal is weighted with a plurality of prediction filters;
generate a correlation matrix for the initial combined decimation filter from the input signal;
generate an observation vector for the initial combined decimation filter from the input signal;
extract an optimized combined decimation filter from the correlation matrix and the observation vector, the optimized combined decimation filter comprising a plurality of optimized decimation filters; and
de-concatenate the optimized combined decimation filter into the plurality of optimized decimation filters.

4. A computerized method comprising:
generating a correlation matrix and observation vector for an image;

initializing a plurality of decimation filters corresponding to a plurality of classes classifying the image;

for each class in the plurality of classes, generating a class-coupling term using the plurality of decimation filters;

generating a modified observation vector using the class-coupling term and the plurality of decimation filters; and for each class in the plurality of classes, replacing the decimation filter corresponding to the class with an optimized decimation filter extracted from the correlation matrix and the modified observation vector.

5. The computerized method of claim 4 wherein initializing the plurality of decimation filters comprises:

generating a target pixel-to-class map;

for each class in the plurality of classes, generating a modified input signal from the image and prediction filters associated with the image;

generating a modified correlation matrix and observation vector for each class using the modified input signal and the image; and extracting a decimation filter for each class in the plurality of classes based on the modified correlation matrix and the modified observation vector.

6. A non-transitory computer-readable storage medium storing instructions which when executed by a data processing system cause the data processing system to perform operations that process data, the operations comprising:

generating a correlation matrix and observation vector for an image;

initializing a plurality of decimation filters corresponding to a plurality of classes classifying the image;

for each class in the plurality of classes, generating a class-coupling term using the plurality of decimation filters;

generating a modified observation vector using the class-coupling term and the plurality of decimation filters; and for each class in the plurality of classes, replacing the decimation filter corresponding to the class with an optimized decimation filter extracted from the correlation matrix and the modified observation vector.

7. The non-transitory computer-readable storage medium of claim 6 wherein initializing the plurality of decimation filters comprises:

generating a target pixel-to-class map;

for each class in the plurality of classes, generating a modified input signal from the image and prediction filters associated with the image;

generating a modified correlation matrix and observation vector for each class using the modified input signal and the image; and extracting a decimation filter for each class in the plurality of classes based on the modified correlation matrix and the modified observation vector.

8. A system comprising:

a processor coupled to a bus;

a memory coupled to the processor through the bus; and instructions executed by the processor from the memory to cause the processor to generate a correlation matrix and observation vector for an image;

initialize a plurality of decimation filters corresponding to a plurality of classes classifying the image;

for each class in the plurality of classes, generate a class-coupling term using the plurality of decimation filters;

generate a modified observation vector using the class-coupling term and the plurality of decimation filters; and for each class in the plurality of classes replace the decimation filter corresponding to the class with an optimized decimation filter extracted from the correlation matrix and the modified observation vector.

9. The system of claim 4 wherein initializing the plurality of decimation filters comprises:

generate a target pixel-to-class map;

for each class in the plurality of classes, generate a modified input signal from the image and prediction filters associated with the image;

generate a modified correlation matrix and observation vector for each class using the modified input signal and the image; and extract a decimation filter for each class in the plurality of classes based on the modified correlation matrix and the modified observation vector.

* * * * *